United States Patent [19]
Blake et al.

[11] Patent Number: 6,133,936
[45] Date of Patent: Oct. 17, 2000

[54] METHOD AND APPARATUS FOR HOLDING RECORDING MEDIA ONTO A MEDIA SUPPORT SURFACE

[75] Inventors: Laurence S. Blake, Methuen, Mass.; Jeffrey M. Janway, Manchester; John D. Kennedy, Brentwood, both of N.H.; Stephen R. Manning, North Andover, Mass.; Steven W. Nickson, Derry, N.H.; Philip A. Rombult, Bradford; Nicholas K. Stefanidakis, Bedford, both of Mass.

[73] Assignee: Agfa Corporation, Wilminton, Mass.

[21] Appl. No.: 08/868,526

[22] Filed: Jun. 4, 1997

[51] Int. Cl.[7] .................................................. B41J 11/00
[52] U.S. Cl. ........................ 347/262; 347/264; 346/138
[58] Field of Search ................................ 347/215, 260, 347/262, 264; 226/95; 271/276; 346/138

[56] References Cited

U.S. PATENT DOCUMENTS 4,468,017  8/1984  Pavone ........................................ 269/21
5,446,477  8/1995  Baeck et al. .............................. 347/138

Primary Examiner—N. Le
Assistant Examiner—Hai C. Pham
Attorney, Agent, or Firm—John A. Merecki; Edward L. Kelley; Erik Ence

[57] ABSTRACT

A system for holding recording media onto a media support surface, comprises, a media support element including a media support surface and a second side, substantially opposing the media support surface. A plurality of vacuum ports pass from the media support surface to the second side and communicate with a device for drawing air through each of the plurality of vacuum ports to hold the recording media against said media support surface. A sequencing manifold connected between the device for drawing air and the plurality of vacuum ports selectively draws air through a portion of the plurality of vacuum ports over a region substantially matching the size of the recording media.

35 Claims, 8 Drawing Sheets

METHOD AND APPARATUS FOR HOLDING RECORDING MEDIA ONTO A MEDIA SUPPORT SURFACE

RELATED APPLICATIONS

The present application is related to simultaneously filed co-pending U.S. application Ser. Nos. 08/868,720, filed on Jun. 4, 1997 (Attorney Docket 3175-017) entitled "IMAGING SYSTEM WITH MOVABLE REGISTRATION PINS", 08/868,970, filed on Jun. 4, 1997 (Attorney Docket 3175-018) entitled "IMAGING SYSTEM WITH HIGH EFFICIENCY MEDIA LOADING", 08/868,969, filed on Jun. 4, 1997 (Attorney Docket 3175-023) entitled "REGISTRATION DETECTION APPARATUS FOR IMAGING SYSTEMS" and 08/876,128, filed on Jun. 4, 1997 (Attorney Docket XP-0473) entitled "METHOD AND APPARATUS FOR SELECTIVELY DRAWING AIR FROM A PLURALITY OF VACUUM CHANNELS".

FIELD OF INVENTION

The present invention relates in general to vacuum systems for holding recording media onto a media support surface. More particularly, the present invention is directed to an imaging apparatus used for recording an image onto various size photosensitive aluminum or polyester printing plates wherein vacuum is sequentially applied to a media support surface to hold the selected plate size in place during imaging.

BACKGROUND OF THE INVENTION

A typical laser scanning system is utilized in electronic prepress operations to write or record images for subsequent reproduction or to scan a prerecorded image at a predefined resolution rate. Such scanning systems may write or record images onto a recording media including photo or thermal sensitive paper or polymer films, photo or thermal sensitive coatings or erasable imaging materials mounted onto an image recording surface or photo or thermal sensitive paper, polymer film or aluminum base printing plate materials, all used in electronic image reproduction. Other scanning systems may read or scan an image recorded on a film negative, photographic paper or other substrate for digitizing the image. In each of these applications, different size media are used in depending on the image to be scanned. Such media are mounted onto a support media surface which may be flat or curved (e.g., semi-cylindrical drum) and scanned with a recording or scanning beam.

The media may be held to the support surface by vacuum which is applied through vacuum ports disposed over the support surface. Typically, a constant vacuum pressure is applied drawing an equal volume of air through each of the vacuum ports disposed over the entire media support surface, regardless of the size of the media. Thus, larger size media are held more firmly to the support surface than smaller media because the larger media cover more vacuum ports thereby reducing leakage in the vacuum system allowing for greater vacuum. In order to reduce air loss in the vacuum system when not all the vacuum ports are covered by the media, it would be advantageous to apply vacuum to only those vacuum ports covered by the media. This will also allow smaller size media to be held more firmly to the support surface without increasing the vacuum capacity of the system.

It is known in the prior art to provide a series of grooves or groove patterns along the media support surface with each groove connected to one or more vacuum ports such that as air is drawn from a vacuum port the media is drawn onto the recording surface and air is further drawn from the groove thereby drawing the media down onto the media support surface over a wider area. A problem with these systems is that during the loading of the media onto the media support surface the media leading edge often catches in the grooves causing the media to buckle and jam. Ideally, groove patterns disposed in the support surface should not interfere with the travel of the media as it is loaded onto the support surface.

Finally, different thickness media (or media with different rigidity characteristics) are utilized in the scanning process. A problem arises if the vacuum applied causes the media to flex as it drawn into the groove pattern. Therefore, there remains a need to adjust the level of vacuum depending on the stiffness characteristics of the media.

OBJECTIVES OF THE INVENTION

Accordingly, it is a primary object of the present invention to provide a vacuum system which applies a vacuum to a predetermined region of the support surface to significantly reduce vacuum loss and reduce air volume required by the system.

It is another object of the present invention to increase the surface area of the support surface per vacuum port without increasing the total number of vacuum ports.

It is a further object of the present invention to reduce media jams caused by the groove pattern during loading of the media onto the media support surface.

It is yet another object of the present invention to adjust the volume of air drawn through the vacuum ports to avoid overflexing the media by drawing it into groove patterns disposed in the support surface.

Additional objects, advantages, novel features of the present invention will become apparent to those skilled in the art from this disclosure, as well as by practice of the invention. While the invention is described below with reference to the preferred embodiments for electronic prepress applications, it should be understood that the invention is not limited thereto. Those of ordinary skill in the art having access to the teachings herein will recognize additional applications, modifications, and embodiments in other fields, which are within the scope of the invention as disclosed and claimed herein and with respect to which invention could be of significant utility. Accordingly, it is intended that the scope of the present invention be limited by the claims below, including the equivalents thereof.

SUMMARY DISCLOSURE OF THE INVENTION

A system for holding recording media onto a media support surface, comprising, a media support element including a media support surface and a second side, substantially opposing the media support surface. A plurality of vacuum ports pass from said media support surface to said second side and communicate with a device for drawing air through the plurality of vacuum ports to hold the recording media against said media support surface. A sequencing manifold connected between the device for drawing air and the plurality of vacuum ports selectively draws air through a portion of the vacuum ports.

The portion of the plurality of vacuum ports may define a predefined region substantially corresponding to the dimensions of a recording media to be held. The region may be smaller than the dimensions of said recording media to be held and the recording media may be drawn from a web of recording media such that the width of said region substantially corresponds to the width of the web of recording media.

The system may further comprise a platesetter controller for receiving the dimensions of a recording media to be held and for driving the device for drawing air and the sequencing manifold to select the vacuum ports defining a region of the media support surface which substantially corresponds to the dimensions of the recording media to be held which may be a web.

The device for drawing air may also be controllable to draw air at least two levels of air volume according to the dimensions of a recording media to be held or the width said web of recording media to be held or the stiffens of the recording media.

A support base which may be formed of a polymer concrete for supporting the media support element at the second side may also include a plurality of air channels disposed within the support base for channeling air between the sequencing manifold and the plurality of vacuum ports. A sealing element interposed between the support base and the support element at the second side may be used in which case the sealing element includes a plurality of apertures for channeling air between the plurality of air channels and the plurality of vacuum ports. Such a configuration may also include a plurality of ribs protruding from the second side. Each rib provides a top surface and side walls such that the sealing element in contact with the top side forms a vacuum chamber defined by the second side, the rib side walls and the sealing gasket such that an aperture in the sealing gasket communicates with one of the air channels in the support base and at least one of the plurality of vacuum ports. In this way each chambers draws air from one or more vacuum ports.

A flexure device may also be disposed between the support element and the support base for minimizing deflection of the media support surface when air is being drawn through the vacuum ports. The flexure device may allows deflection in only one direction so that the media support surface is undistorted during recording of an image. The media support element may comprise a portion of a cylinder having an axial direction and wherein the flexure device allows deflection in said axial direction only.

A plurality of groove patterns may be disposed along the media support surface for drawing air from between the media and the media support surface. The groove patterns each communicate with at least one of the vacuum ports and each groove pattern has a plurality of groove edges which may be oriented such that none of said groove edges is orthogonal to a leading edge of the recording media as it is loaded onto the media recording surface so that media jams are reduced.

A method for holding recording media onto a media support surface is given when the media support surface includes a plurality of vacuum ports disposed thereon and when the vacuum ports are communicating with a device for drawing air through the vacuum ports and a sequencing manifold is connected between the vacuum ports and the device for drawing air. The method is defined by the steps of; positioning the recording media over a region of the media support surface, selecting a plurality of vacuum ports disposed in the region of the media support surface for drawing air through, and drawing air through only those vacuum ports disposed in the region. In addition, the size of a media to be held may be received from a controller and used to defining the size of the region. Further steps may include selecting a volume of air to be drawn through the vacuum ports according to the media size or stiffness and then commanding the device for drawing air to draw air at the selected volume.

An imaging system for imaging different size media supported on a media support surface comprises, a front-end server for editing or storing image files to be printed, a RIP connected to the front end server for processing the image file received from the front-end server into raster image file to be recorded onto a recording media and an image recorder connected to the RIP for recording the raster image files onto the recording media. The image recorder includes a media support element having a media support surface including a plurality of vacuum ports disposed thereon with each vacuum ports being connected to a groove pattern disposed on the media support surface for drawing the media onto the media support surface. A media handler for storing different size media and for loading the different size media onto the media support surface is connected to the image recorder. A vacuum system for drawing air through the plurality of vacuum ports is configured to select a region of the media support surface and to draw air through the vacuum ports disposed on the media support surface within the selected region. The region size and shape are predetermined accordance with the size of the media to be held. The vacuum system may also draw air at more than one air volume level which may be selected according to the size of the region or the stiffness of the recording media.

A media processor may connected to the recording device for automatically processing the recording media after recording.

BRIEF DESCRIPTION OF THE DRAWINGS

The objects and features of the invention will be better understood and further objects and advantages of the invention will become apparent in the following detailed description of the invention, when taken with the accompanying drawing(s), in which.

BEST MODE FOR CARRYING OUT THE INVENTION

Figure 1:
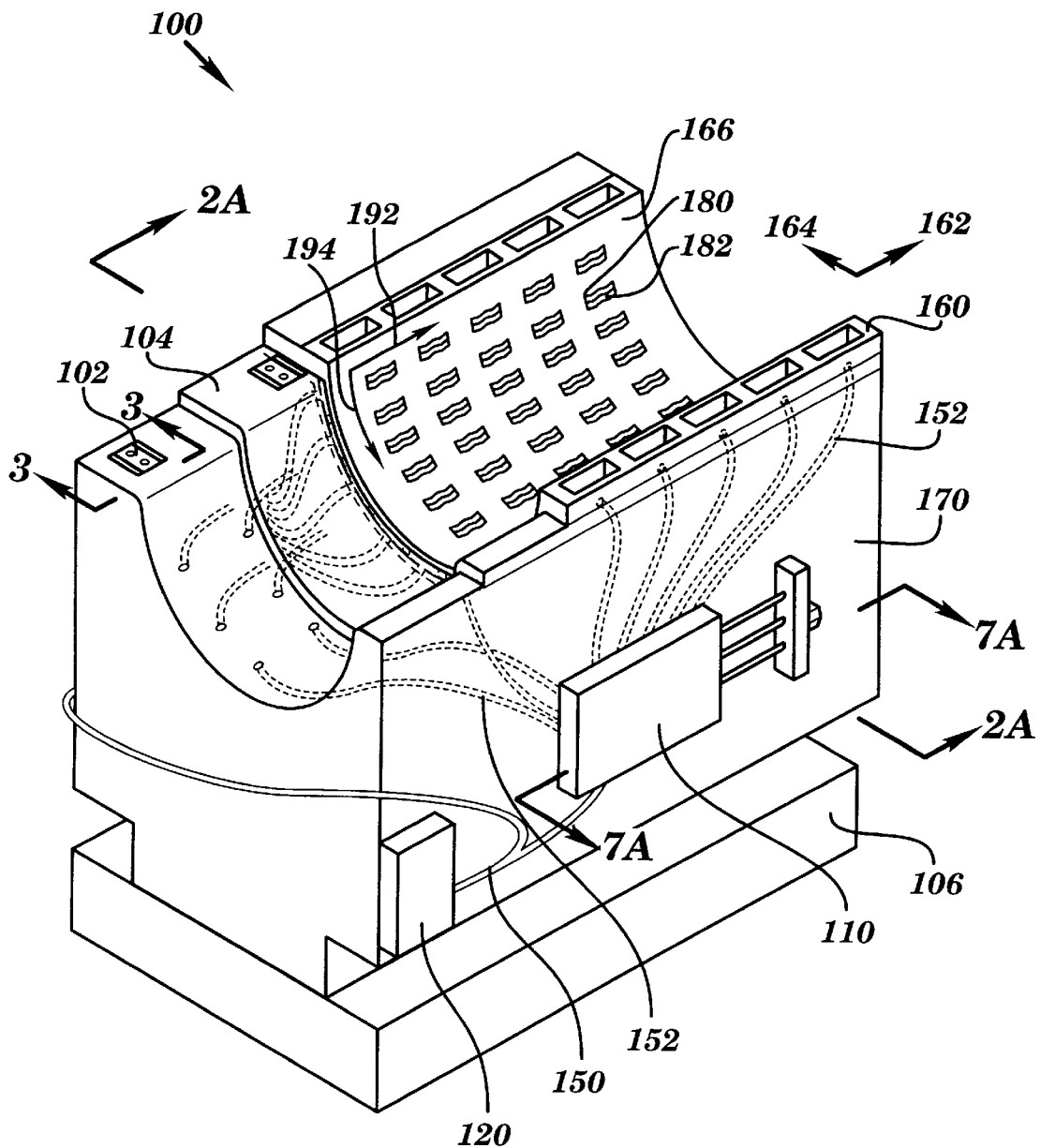
FIG. 1 is an isometric view of an internal drum type laser imagesetter with the gasket and drum partially removed, particularly featuring the vacuum system for holding down media in accordance with the present invention.

Referring now specifically to the accompanying drawings, there is illustrated a vacuum system for an internal drum type laser imagesetter, wherein like reference numerals refer to like elements throughout the drawings.

An internal drum type imagesetter is shown in FIG. 1 and generally referred to as reference number 100. The imagesetter 100 includes a media support element in the form of the inside radius of a portion of a cylindrical drum 160 for supporting media 402 during the scanning procedure. It will be recognized that the drum 160 may be replaced by any media support element including a flat surface or the outside radius of a cylindrical drum. The drum 160 may be supported by a support base 170 or may serve itself as a base. In the preferred embodiment, a sealing element or gasket 104 is disposed between the support base 170 and the drum 160 to seal the vacuum system reducing leakage. A flexure 102 disposed between the support base 170 and the drum 160 serves to allow relative movement between the support base 170 and the drum 160. The base 170 may be comprised of a polymer concrete which serves to dampen vibrations in the imagesetter which disrupt the scan pattern. A steel frame 106 may be used to support the base 170.

Figure 2A:
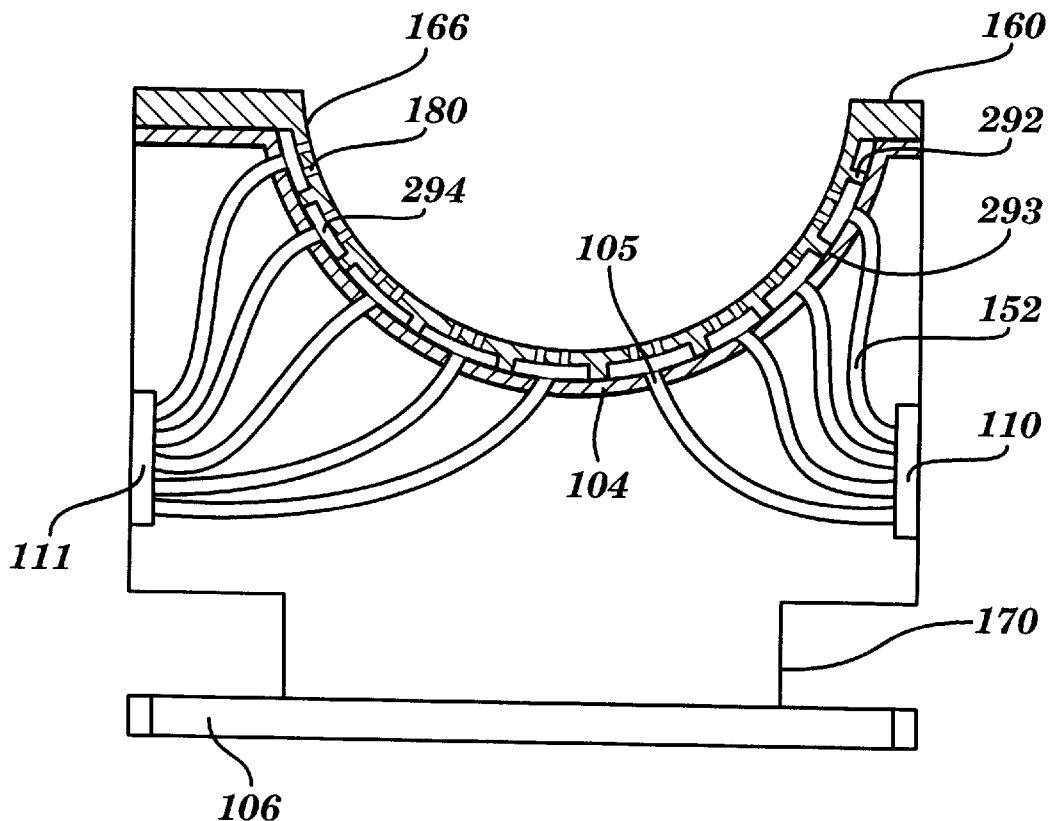
FIG. 2A is a sectional view of the imagesetter in accordance with the present invention.
Figure 2B:
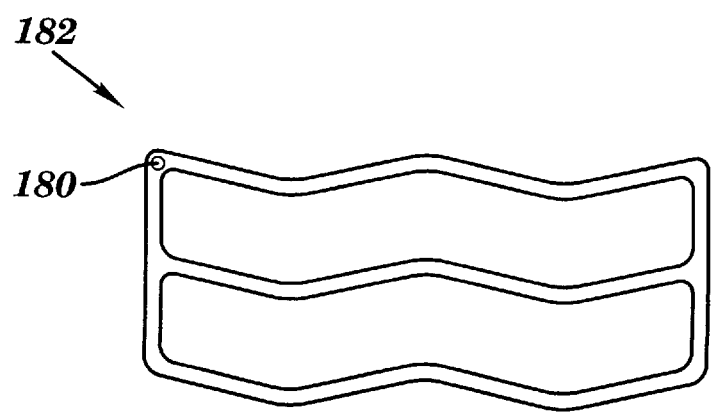
FIG. 2B details the groove pattern shown in FIG. 1.

The vacuum system is illustrated in FIGS. 1, 2A and 2B works in conjunction with the drum 160 and support base 170. The drum 160 may be cast from aluminum and includes a first side forming a media support surface 166 which supports the media 402. A second side 293 substantially opposes the media support surface 166 and may include radial and longitudinal ribs 292. The drum 160 further includes vacuum ports 180 disposed in rows and columns along the axial and circumferential directions of the media support surface 166 as indicated by directional arrows 162 and 164, respectively.

As shown in FIGS. 1 and 2B, groove patterns 182 are disposed along the media support surface 166 which serve to spread vacuum from the vacuum ports 180 over a larger area of the media support surface 166. Typically, the media 402 is introduced into the drum 160 in the circumferential direction 164 such that a leading edge of the media advances across the media support surface substantially parallel to the axial direction 162. In the present invention, the groove patterns 182 are uniquely oriented along the media support surface 166 so that no portion of the groove pattern is parallel to the axial direction 162. This reduces media jams caused by interference between a leading edge of the media 402 and an edge of a groove pattern 182. The groove patterns 182 have cross-section in the shape of a "V", to further reduce the risk of catching a leading edge of the media 402, with a "V" depth of between 0.005 and 0.010 inches. This depth is selected to provide sufficient air flow while not causing the media 402 to be drawn into the groove.

In the preferred embodiment, the media 402, which may be in sheet form, is square or rectangular in shape and has a leading edge and second registering edge (not shown). The media support surface 166 has a first registering edge 192 and a second registering edge 194 forming a registering corner. The use of the second registering edge 194 is not necessary since the present invention can be practiced for center justified media as well as edge justified media. A media corner (not shown) is positioned on the registering corner of the media support surface 166 with the edges of the media 402 positioned parallel relative to the registering edges 192, 194 of the inner surface. A first row and column of vacuum ports 180 are positioned underneath the registering edges of the media 402 to insure the maximum number of vacuum ports are exposed to the media. Only those vacuum ports 180 underneath the media 402 are selected to have air drawn through. It is important that the vacuum ports 180 be connected to the groove pattern 182 closest to the registering corner of the media support surface 166. This insures that different size media 402 cover the maximum number of vacuum ports 180. It will be recognized that any shape media 402 or any media position with respect to the media support surface 166 can be used in the scanning process providing only the vacuum ports 180 underneath the media are selected to have air drawn through.

The drum's second side 293 may include a plurality of radial and longitudinal ribs 292, each including a top surface 293 along which the gasket 104 rests to define a plurality of vacuum chambers 294 formed by the drum second side 293, the side walls of each rib 292 and the sealing gasket 104. The sealing gasket 104 includes a plurality of apertures 105 for allowing air to be drawn from each of the vacuum chambers 294. The vacuum chambers 294 communicate with at least one vacuum port 180 to draw air from the vacuum port 180. The chambers 294 may be large enough to draw air from any number of vacuum ports 180.

A series of vacuum channels 152 and 150, shown in phantom lines in FIG. 1 and in FIG. 2A channel air being drawn by a vacuum pump 120. A sequencing manifold 110 is connected between the vacuum pump 120 and the vacuum chambers 294 to control the flow of air being drawn by the vacuum pump 120 through the sequencing manifold 110 and through the gasket apertures 105 and the vacuum chambers 294 and the vacuum ports 180. Thus, another function of the base is to house the vacuum channels 152 running between the vacuum chambers 294 and the vacuum manifold 110. The channels 152 may be cast into the concrete polymer support base 170 by fabricating a tubing mold (not shown) from wax and then removing the wax by heating the base after fabrication or standard vacuum hoses may be used to channel the vacuum from the vacuum manifold 110 and the vacuum pump 120. In the preferred embodiment, a sequencing vacuum manifold 110 is mounted on either side of the base 170. This embodiment reduces the total number of vacuum channels 152 needed to be cast into the base 170 thereby maintaining the stiffness of the support base 170. It will be recognized that other vacuum systems could comprise one or more vacuum manifolds 10.

A device for drawing air 120 is mounted to the base 170 which provides vacuum to the vacuum manifold 110 through vacuum hoses 150. The device for drawing air may be comprised of a venturi type device in which air is forced through a tube (not shown) with a tapering constriction in the middle that causes an increase in the velocity flow of the air and a corresponding decrease in air pressure which provides vacuum or typical vacuum pump arrangements may be used. It is critical that the vacuum applied does not draw the media 402 into the groove pattern 182 causing the media to flex which will distort the scan pattern. Thus, the device for drawing air 120 is provided with more than one setting for increasing or decreasing the volume of air being drawn depending on the type of media 402 to be held. For example, polyester media is more pliable than an aluminum media so the device for drawing air is made to be controllable to reduce the volume of air being drawn so flexing does not occur.

Figure 3:
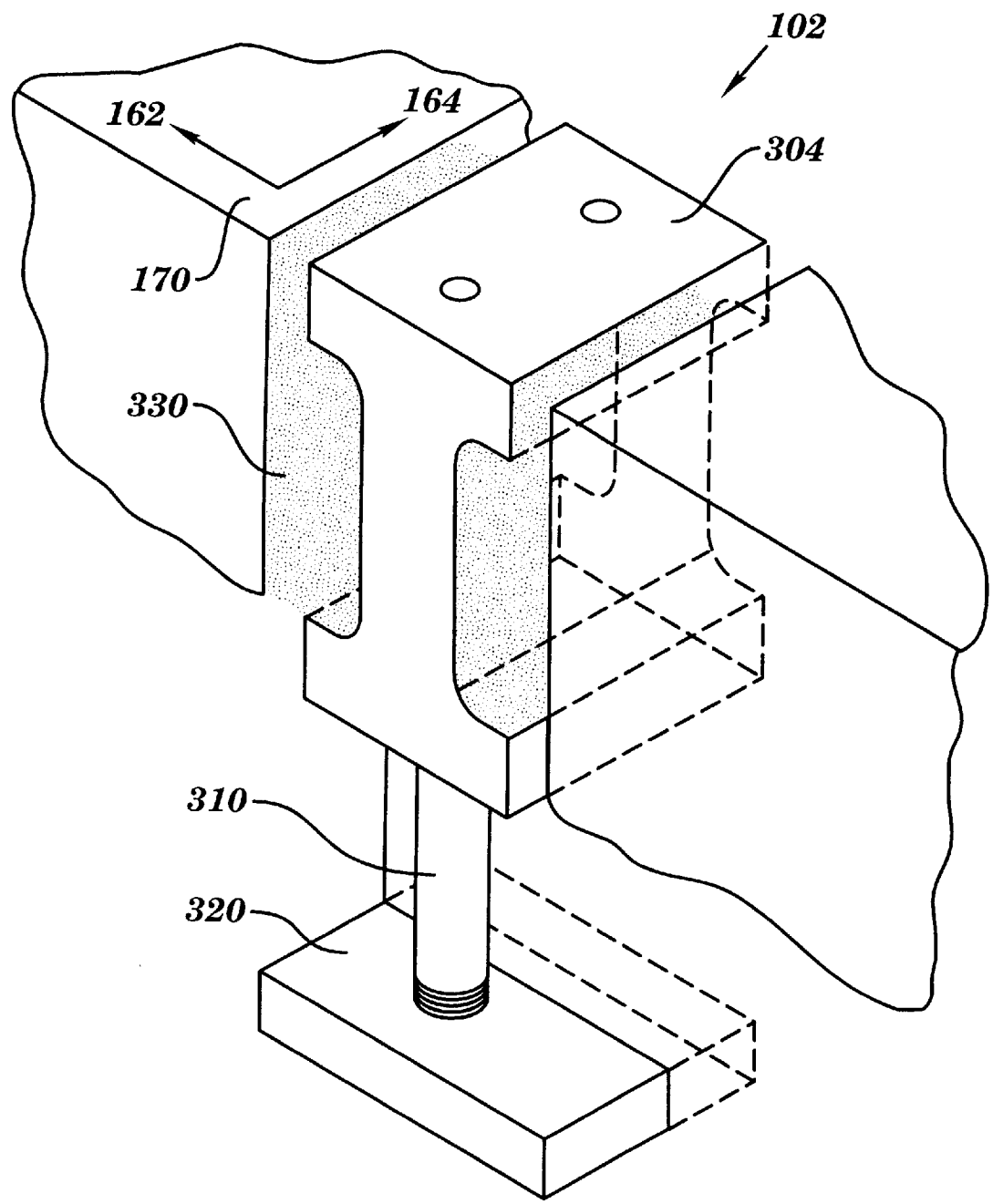
FIG. 3 is a detailed isometric view of a flexure assembly shown in FIG. 1.

Referring now specifically to FIG. 3, there is illustrated an enlarged, perspective view of the flexure assembly 102 which comprises a flexure 304, a compliant molding substance 330, a threaded rod 310, and a threaded anchor plate 320. Because the drum 160 will deflect in the circumferential direction 164 when vacuum is applied, the flexure assembly 102 is needed to minimize this deflection or the cylindricity will change thereby distorting the scan pattern. The flexure assembly 102 is also used to compensate for thermal expansion cycling of the drum 160 relative to the base 170. It is critical to allow any movement between the base 170 and the drum 160 in the axial direction 162 only and not the circumferential direction 164, as movement in the latter with alter the cylindricity of the drum 160 thereby distorting the scan pattern. Thus, the flexure 304 is made of a substantially rigid material such as stainless steel and may be in the shape of an I-beam, positioned along the circumferential direction 164 of the base 170. A compliant molding substance 330 is placed on either side of the flexure in the axial direction only 162. The flexure 304 is anchored into the base 170 by a threaded rod 310 connected to the anchor plate 320.

As an alternative embodiment of the present invention, the vacuum channels 152 may be directly connected to the vacuum ports 180. This configuration eliminates the vacuum chambers 294, but requires that a separate hose fitting (not shown) be used for each vacuum port 180. The present invention has the advantage that each vacuum chamber 294 can communicate with more than one vacuum port 180.

Figure 4A:
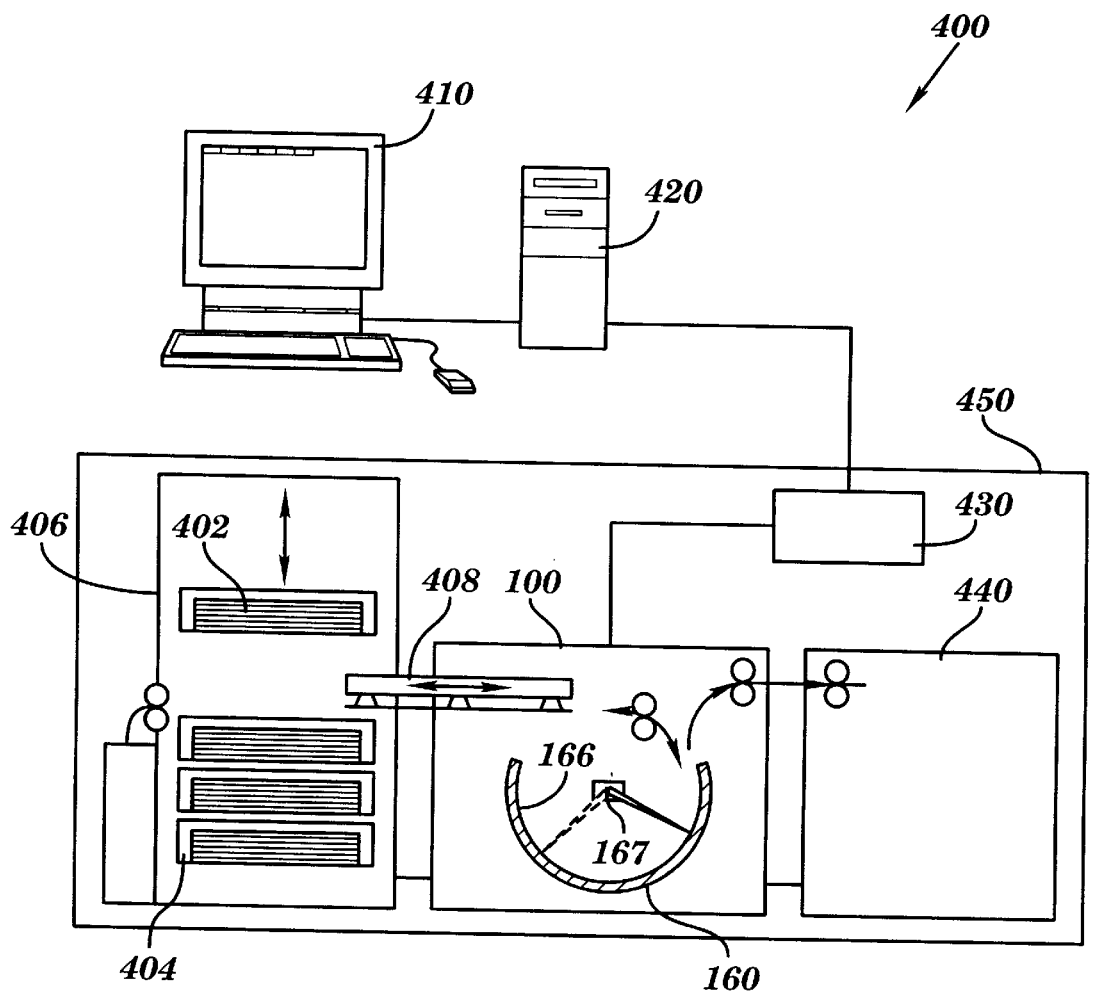
FIG. 4A is a schematic illustration of an electronic prepress system in which the internal drum type laser imagesetter is shown.

Turning now to FIG. 4A, the internal drum type imagesetter 100 is shown in a computer to plate imaging system 400. In this system for plate production, digital data files representing images to be printed by a printing press are input to or stored on a front-end server 410 and plates ready for mounting onto a printing press are output from the system plate processor 440. The system 400 is comprised of a front-end server 410, a raster image processor (RIP) 420 and a platemaker or platesetter 450. The front-end 410 sends jobs to the platesetter 450. The platesetter 450 has three major components. An optional on-line plate handler 406, the imaging engine or imagesetter 100, and an optional processor/plate stacker 440. The media handler 406 contains a supply of media containers or cassettes 404. The cassettes 404 can be vertically adjusted by the handler 406 to make media 402 stored within a particular cassette available to a media shuttle mechanism 408. The media shuttle mechanism 408 removes a single piece of media 402 from the selected cassette and transports the media between the handler 406 and the imagesetter 100.

In operation, the front-end 410 sends data to the platesetter controller 430 through an interface connection. Typically this data represents a "job" which requires the imaging of media 402. This data contains information about the job's requirements, such as the media material, the media size, the image size and the media thickness. The platesetter controller 430 controls the overall operation of the imaging engine 100, including the vacuum manifold 110, and the device for drawing air 120. The platesetter controller 430, through workflow software stored in memory, instructs the media handler 406 to move the appropriate media 402 into a load position for a media shuttle mechanism 408. The media shuttle mechanism 408 transports the media 402 to the imagesetter 100 and the media is loaded onto the media support surface 166 of the drum 160 by an applicator assembly (not shown). The system controller 430 commands the device for drawing air 120 to draw air at a predetermined pressure and volume depending on the media selected and commands the manifold 110 to select only the vacuum ports 180 which are covered by the media 402.

The imaging engine 100 includes an imaging head 167 such as a scan assembly which is often disposed and movable within the drum 160 in which the recording or recorded media is mounted. The platesetter controller 430, in accordance with the signals from the RIP and its own programmed instructions, generates signals to control the scanning so as to write images on or read images from the media mounted within the drum 160 by scanning one or more optical beams over the inside surface 166 of the drum while the drum itself remains fixed.

Figure 4B:
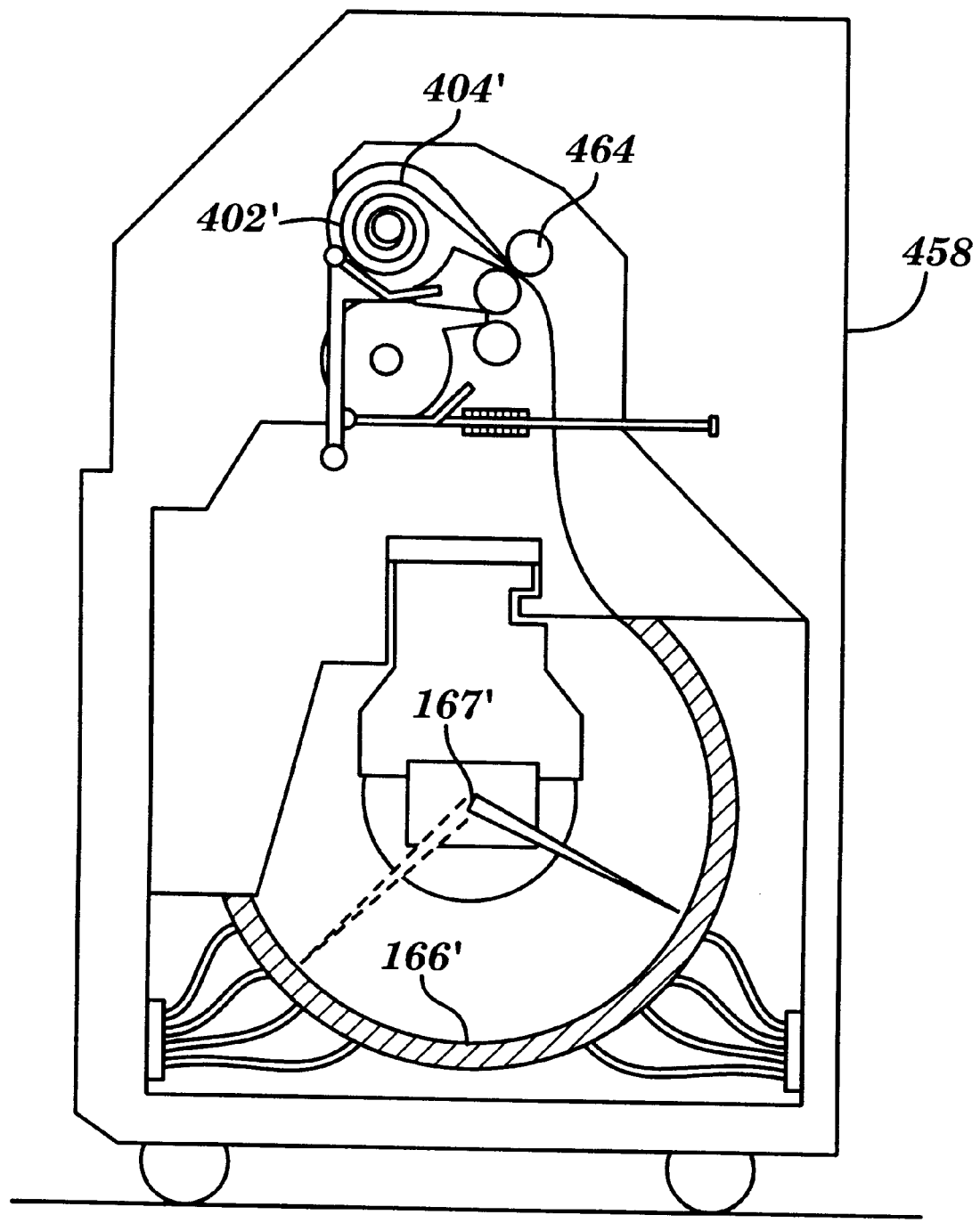
FIG. 4B is an alternative illustration of an electronic prepress system particularly featuring a web of recording media.

In an alternative embodiment of the invention, the media 402 may be drawn off a web of recording media 402' housed in a light-tight cassette 404' in an imaging system 458 shown in FIG. 4B. The web of recording media 402' is fed via a feeding mechanism 464 which transports the media onto the media support surface 166'. The web of recording media 402' is held to the media support surface 166' by a vacuum system described above and scanned by an imaging head 167' also described above. The web of recording media 402' can be cut into a sheet either before or after imaging.

Figure 5A:
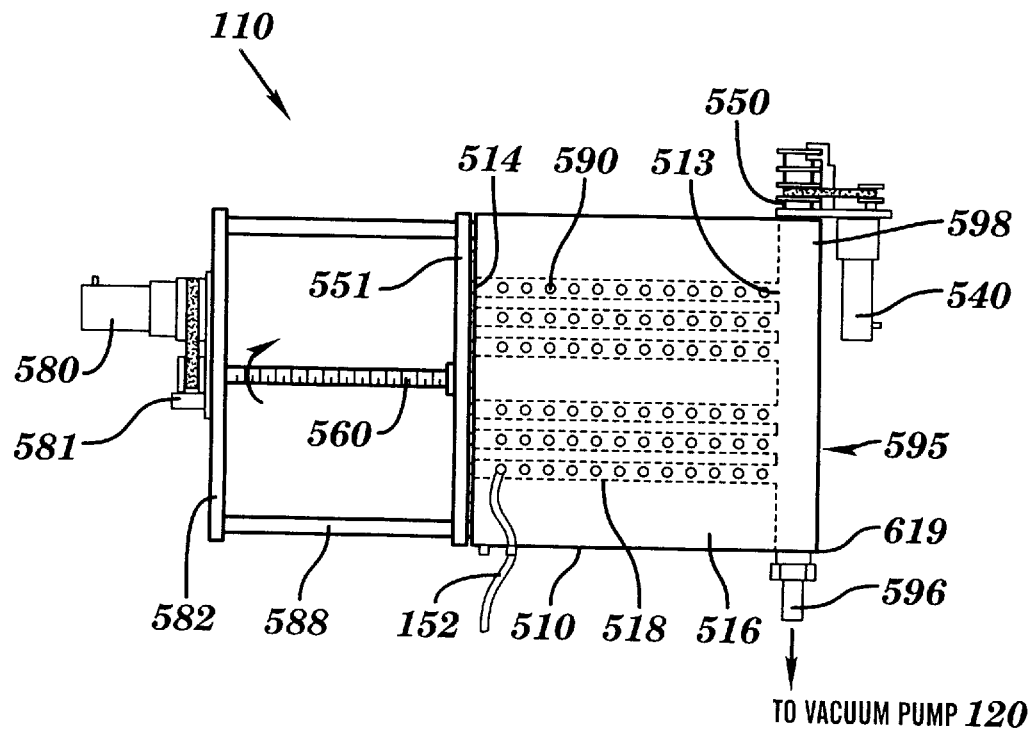
FIG. 5A is a sectional view of the manifold shown in FIG. 1 in a home position.
Figure 5B:
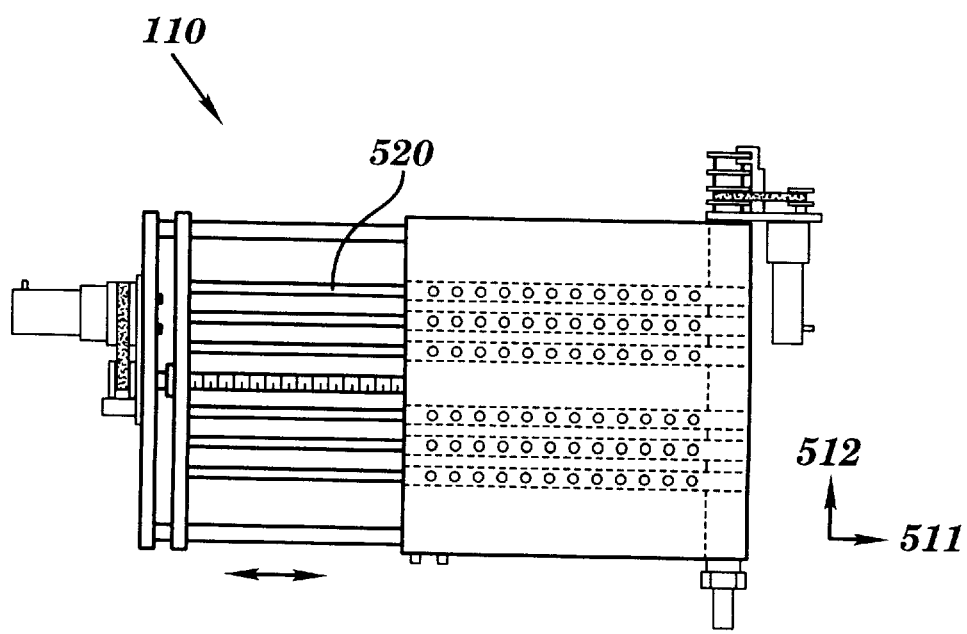
FIG. 5B is a sectional view of the first embodiment of the manifold shown in FIGS. 1 and 5A in a position adjusted for the size of the media.

FIGS. 5A and 5B show a rear view of the sequencing manifold 110 used to selectively draw air from a predefined number vacuum channels 152. A manifold block 510, is a fixed element rectangular in shape having an outer surface 516 and a first 511 and second axis 512. A plurality of parallel axial cylinders 518 are formed in the block 510, each having a longitudinal axis substantially parallel with the first axis 511 and each having a first 513 and second 514 end. The block 510 includes a plurality of holes 590 arranged in rows along the longitudinal axis of each cylinder 518 and passing through the wall of the block 510 and communicating with the cylinder 518 such that air drawn from a cylinder 518 can be drawn through each of the holes 590 arranged along its longitudinal axis.

Each hole 590 communicates with a vacuum chamber 294 or directly with a vacuum port 180 via hoses or channels 152. The interconnection of the holes 590 with the chambers 294 or the ports 180 determines which patterns of vacuum ports 180 will draw air and, if desired, the order of drawing air from the vacuum ports 180.

A plurality of axial pistons 520 engage with each of the cylinders 518 and are slideably movable therein and serve to block air flow from a selected number of holes 590 depending on the depth of engagement of the pistons 520 within the cylinders 518. The plurality of pistons 520 are linked together with an axial tie bar 551 which is slideably mounted on a linear bearing 588. A lead screw 560 is connected to the axial tie bar 551 and threadedly engaged with an axial carriage 582. The axial carriage 582, in turn, is fastened to the linear bearing 588. An axial motor 580 connected to the axial carriage 582 and to the lead screw 566 rotates the lead screw causing the axial pistons 520 to translate along the cylinders 518 to the desired depth of engagement. Thus the cylinders 518 may be sequentially selected to draw air through none of the holes 590, when the axial pistons 520 are fully engaged within the cylinders 518, i.e., the axial pistons 520 are positioned towards the first end 513 of the axial cylinders 518. Similarly, all of the holes 590 may be selected to have air drawn through, when the axial pistons 520 are substantially disengaged from the cylinders 518, or positioned towards the second end 514 of the axial cylinders 518.

An axial sensor 581, fixedly fastened to the axial carriage 582, counts the number of revolutions of the lead screw 560 thereby determining the engagement of the axial pistons 520 relative to the cylinders 518. The axial sensor 581 provides feedback to the platesetter controller 430 which interfaces with the axial motor 580. In the present embodiment, a row of holes 590, all communicating to the same cylinder 518 are interconnected to a row of vacuum ports 180 or vacuum chambers 294 disposed along the drum axial direction 162. In operation, the platesetter controller 430 receives the media information required for the job and directs the axial motor 580 to translate the axial pistons 520 in and out of the manifold block 510 according to the size of the media 402, in the axial direction 162. For the widest media 402, which substantially fills the drum in the axial direction 162, the pistons 520 are substantially disengaged so that air can be drawn through each hole 590 along the cylinder 518. The system can be controlled to apply vacuum over the entire media 402, all at one time, by commanding the device for drawing air 120 to start drawing air with the axial piston 520 in the final position or, the vacuum may be sequentially applied by drawing air continuously while the axial piston 520 moves past each hole 590.

Figure 6:
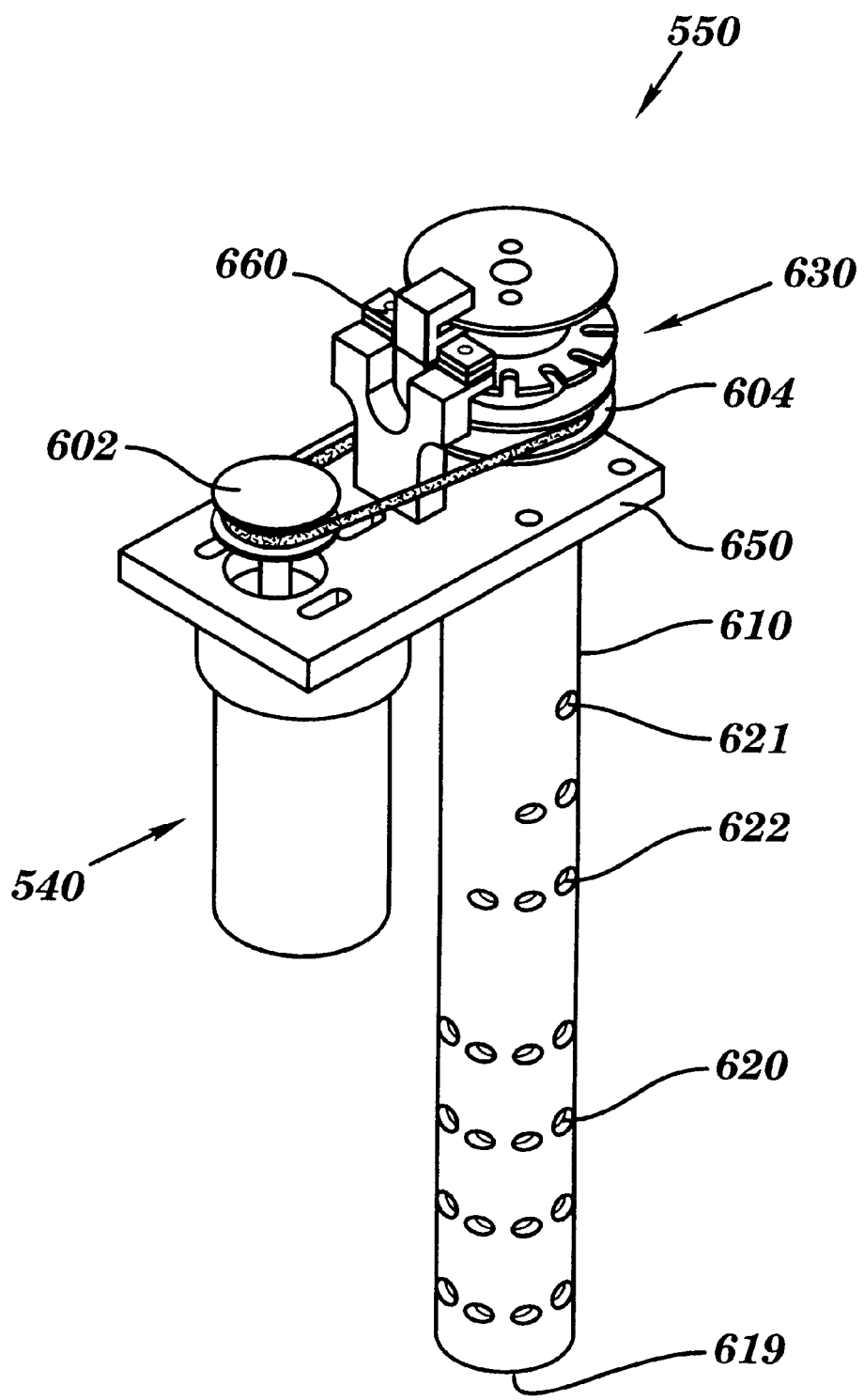
FIG. 6 is a detailed isometric view of the master cylinder of the manifold shown in FIGS. 5A and 5B.

As shown in FIGS. 5A, 5B, and in FIG. 6, the block 510 further includes a master cylinder bore 595 having a longitudinal axis passing through the block 510, along its second axis 512, and communicating with the first end 513 of each of the cylinders 518. A fitting 596, installs into the block 510 and connects the sequencing manifold 110 with the device for drawing air 120 such that air drawn from a cylinder 518 through the fitting 596 can be drawn through each of the cylinders 518 and in turn through each of the holes 590.

To control the flow air and to sequentially select which cylinder 518 to draw air through, a master cylinder 550 engages with the master cylinder bore 595. The master cylinder 550 is comprised of a precision machined rotary piston 610 which is hollow along its longitudinal axis and open to the fitting 596 at a first end 619 for allowing air to be drawn from the hollow center of the rotary piston 610. The rotary piston 610 is closed at a second end 598 and is rotatably mounted within the master cylinder bore 595 on a radial bracket 650 which also supports a drive motor 540 for rotating the piston 610.

The rotary piston 610 includes a plurality of apertures 620 arranged in columns along the longitudinal axis of the piston 610 and passing through the wall of the piston 610 to the hollow center. Each apertures 620 is arranged to engage with a cylinder 518 such that air drawn through the hollow center of the rotary piston 610 will be drawn from a cylinder 518 which is aligned with an aperture 620. A first column of apertures 621 provides one aperture 620 for each of the cylinders 518 such that when column 621 is aligned with the cylinders 518 air is drawn from them all. A second column of apertures 622 is radially spaced from the first column of apertures 621 and includes one less aperture 620 such that upon rotation of the rotary piston 610, column 622 aligns with the cylinders 518, and air is drawn from all but one of the cylinders 518. The rotary piston 610 can therefore be positioned to draw air from none of the cylinders 518 or all of the cylinders 518 by rotation within the master cylinder bore 595.

A motor 540 connected to the radial bracket 650 rotates the rotary piston 610 causing the columns of apertures 621 and 622 to sequentially align with the axial cylinders 518. A sensor 660, fixedly fastened to the radial bracket 650, determines the rotary position of the rotary piston 610 relative to the manifold block 510 by interfacing with an encoder wheel 630. The sensor 660 sends this information to the platesetter controller 430 which controls the motor 540 to access a desired position.

As stated above, a row of holes 590, all connected to the same cylinder 518, is interconnected to a row of vacuum ports 180, or vacuum chambers 294, disposed along the drum axial direction 162. Each cylinder 518 thus controls air flow to a different row of vacuum ports 180, or vacuum chambers 294, disposed along the drum axial direction 162 such that by controlling the flow of air to each cylinder 518 with the rotary piston 610, air is drawn from rows of vacuum ports 180 disposed along the drum circumferential direction 164.

In operation, the platesetter controller 430 receives the media information required for the job and directs the motor 540 to rotate the rotary piston 610 to draw air from a predetermined number of cylinders 518, in accordance with the size of the media 402, in the circumferential direction 164. For the longest media 402, which substantially fills the drum in the circumferential direction 164, each of the cylinder 518 is aligned with an aperture 620.

The system can be controlled to apply vacuum over the entire media 402, all at one time, by commanding the device for drawing air 120 to start drawing air with the axial piston 520 and the rotary piston 610 in the final position, or, the vacuum may be sequentially applied by drawing air continuously while controlling the axial piston 520 and the rotary piston 610 to move in the desired manner to sequence the drawing of air through the vacuum ports 180.

A second vacuum manifold 111 may be used and disposed opposed to the first manifold 110 shown in FIG. 2A. Such a configuration is more convenient for interconnection of the hoses or channels 152. The interconnection of holes 590 with vacuum ports 180 or vacuum chambers 294 is simplified by dividing the media support surface 166 into two sections and controlling air flow to each section with separate manifolds 110 and 111 which are substantially identical. In this case the operation is controlled by duplicate motors 540 and 580 and duplicate sensors 660 and 581 to fully control the vacuum system.

The interconnection of holes 590 with vacuum ports 108 or chambers 294 allows various regions of vacuum ports 108 to be selected for drawing air, according to the particular application and or position of the media 402 with respect to the media support surface 166. The order of which drawing air from a pattern of vacuum ports 108 may also be selected by the interconnecting scheme. In the present embodiment, the media 402 is loaded onto the media support surface 166 edge justified against the registration corner formed at the intersection of the registration axes 192 and 194. The region, of vacuum ports 108, selected for drawing air as axial piston 520 and rotary piston 610 move forms a rectangular or square pattern which originates with the vacuum port 108 adjacent the registration corner at the intersection of axes 192 and 194 and advances along the registration axes 192 and 194 toward the opposing edges of the media recording surface 166.

It will be recognized by those skilled in the art that other interconnection schemes between the holes 590 and the vacuum ports 180 can provide other patterns which may be center justified with respect to the media support surface 166 or justified against other edges of the surface 166.

Figure 7A:
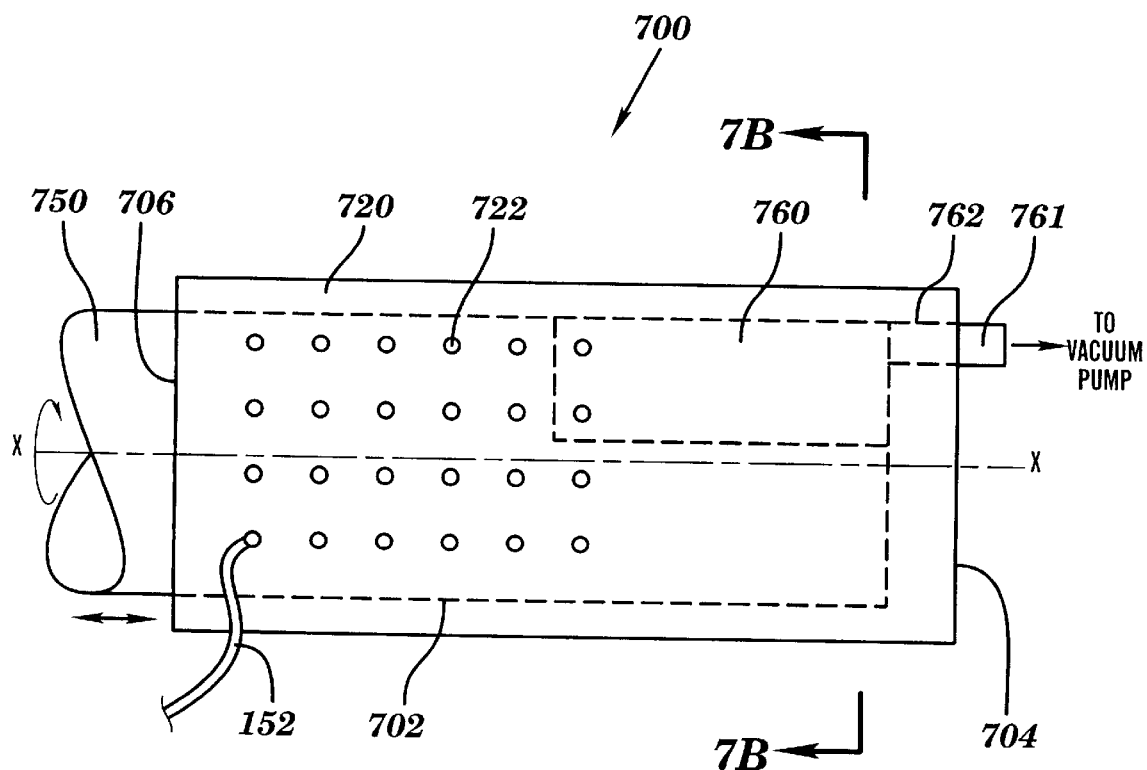
FIG. 7A is a partial side view of a second embodiment of the manifold.
Figure 7B:
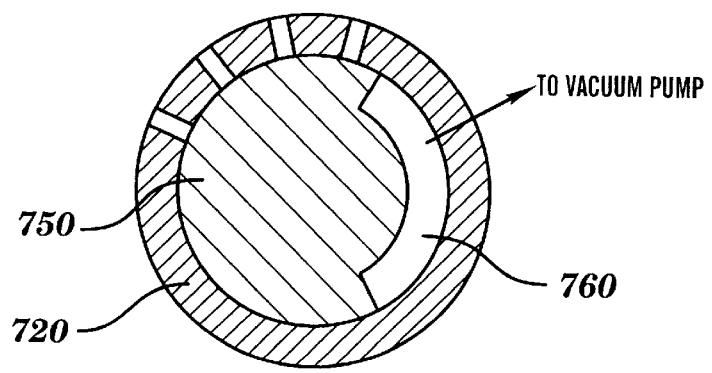
FIG. 7B is a sectional view of the manifold shown in FIG. 7A.

FIGS. 7A and 7B depict a second embodiment of a manifold which includes a fixed element 700, which may be configured in a cylindrical shape, and includes a first 704 and second 706 end. The fixed element 700 has an outer surface 720 and an internal cylinder 702 with a longitudinal axis positioned substantially parallel to the first or longitudinal axis X—X of the fixed element. A plurality of uniformly spaced holes 722 are arranged in rows along the longitudinal axis and pass through the outer surface 720 of the fixed element 700 and communicate with the internal cylinder 702. Each hole 722 communicates with a vacuum chamber 294 or directly with a vacuum port 180 via hoses or channels 152.

A piston 750 is rotatably and slideably mounted within the internal cylinder 702 along the longitudinal axis and includes a hollow chamber or portion 760 which communicates with the plurality of holes 722 upon rotation and translation of the cylinder. A fitting 761, located at the first end 704, installs into the fixed element 700 and connects the fixed element with the device for drawing air 120. A fitting aperture 762 connects the fitting 762 and the hollow chamber 760, such that air can be drawn from each of the plurality of holes 722.

In the present embodiment, a row of holes 722 positioned orthogonal to the longitudinal axis of the fixed element 700, are interconnected to a row of vacuum ports 180 or vacuum chambers 294 disposed along the drum circumferential direction 164. The piston 750 is slideably movable along the longitudinal axis of the fixed element 700 and serves to block or allow air flow from a selected number of holes 722 positioned in rows along a second axis orthogonal to the longitudinal axis of the fixed element 700 depending on the depth of engagement of the piston within the internal cylinder 702. For the widest media 402, which substantially fills the drum in the circumferential direction 164, the piston 750 is substantially disengaged so that air can be drawn through each row of holes 722 orthogonal to the longitudinal axis of the fixed element 700.

A row of holes 722 disposed along the longitudinal axis of the fixed element 700 are interconnected to a row of vacuum ports 180 or vacuum chambers 294 disposed along the drum axial direction 162. The piston 750 is rotatably movable along the longitudinal axis of the fixed element 700 and serves to block or allow air flow from a selected number of holes 722 positioned in rows along the longitudinal axis of the fixed element depending on the rotational position of the hollow portion 760 relative to the plurality of holes 722. For the longest media 402, which substantially fills the drum in the axial direction 162, the hollow portion 760 is positioned underneath the plurality of holes 180 so that air can be drawn through each row of holes 722 along the longitudinal axis of the fixed element. Thus, by rotating and translating the piston 710, the hollow portion 760 of the piston 750 is sequentially aligned with the plurality of holes 722 thereby selecting a predetermined region of vacuum ports 180. It is also possible with the present embodiment to position the hollow portion 760 away from the plurality of holes 722 so that none of the plurality of holes 720 are selected to have air drawn through.

It will also be recognized by those skilled in the art that, while the invention has been described above in terms of preferred embodiments it is not limited thereto. Various features and aspects of the above described invention may be used individually or jointly. Further, although the invention has been described in the context of its implementation in a particular environment and for particular applications, e.g., electronic prepress applications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A system for holding recording media onto a media support surface, comprising:
    a media support element including said media support surface, a second side, substantially opposing said media support surface, and a plurality of vacuum ports passing from said media support surface to said second side;
    a device, communicating with each of said plurality of vacuum ports, for drawing air through said plurality of vacuum ports to hold the recording media against said media support surface; and,
    a sequencing manifold connected between said device for drawing air and said plurality of vacuum ports for selectively drawing air only through each of the vacuum ports covered by the recording media, the covered vacuum ports comprising a portion of the plurality of vacuum ports.

2. The system according to claim 1, wherein the vacuum ports covered by the recording media define a predefined region of said media support surface.

3. The system according to claim 2, wherein a size of said predefined region of said media support surface substantially corresponds to a size of the recording media to be held.

4. The system according to claim 2, wherein said predefined region of said media support surface is smaller than said recording media to be held.

5. The system according to claim 2, wherein said recording media is drawn from a web of recording media and wherein a width of said predefined region of said media support surface substantially corresponds to a width of said web of recording media.

6. The system according to claim 2, wherein said recording media is drawn from a web of recording media and wherein a width of said predefined region of said media support surface is smaller than a width of said web of recording media.

7. The system according to claim 2, further comprising:
    an inputting device for receiving a size of the recording media to be held; and
    a driving device connected to said inputting device and said sequencing manifold for driving said sequencing manifold to draw air through each of the vacuum ports in the predefined region of said media support surface, said redefined region substantially corresponding to the size of the recording media to be held.

8. The system according to claim 2, wherein:
    said predefined region includes a first and second axis; and
    said sequencing manifold is configured with a first element for controlling the drawing of air through a predetermined number of vacuum ports disposed along said media support surface along said first axis and with a second element for controlling the drawing of air through a predetermined number of vacuum ports disposed along said media support surface along said second axis.

9. The system according to claim 8, wherein said first and second axes arc orthogonal.

10. The system according to claim 8 wherein said first and second axes correspond with first and second axes of the recording media and wherein said predefined number of vacuum ports disposed along said media support surface along said first axis correspond with a length of said recording media along said first axis and wherein said predefined number of vacuum ports disposed along said media support surface along said second axis corresponds with a length of said recording media along said second axis.

11. The system according to claim 1, wherein said recording media is drawn from a web of recording media, said system further comprising:

an inputting device for receiving a width of said web of recording media; and a driving device connected to said inputting device and said sequencing manifold for driving said sequencing manifold to draw air through each of the vacuum ports in the region of said media support surface corresponding to the width of said recording media web.

12. The system according to claim 1, further comprising a plurality of groove patterns disposed along said media support surface for drawing air from between the media and the media support surface, said plurality of groove patterns each communicating with at least one of said plurality of vacuum ports.

13. The system according to claim 1, wherein plurality of vacuum ports are uniformly disposed over said media support surface.

14. A method for holding recording media onto a media support surface, said media support surface including a plurality of vacuum ports disposed thereon, said vacuum ports communicating with a device for drawing air through the vacuum ports and a sequencing manifold connected between said vacuum ports and the device for drawing air, comprising the steps of:

a. positioning the recording media over a region of the media support surface, the recording media covering said region and a portion of the plurality of vacuum ports;

b. selecting the vacuum ports disposed in said region of the media support surface covered by the recording media for drawing air through; and c. selectively drawing air through each of the selected vacuum ports disposed in said region.

15. The method according to claim 14, further including the steps of:

a. receiving a size of a media to be held; and b. defining said region according to the size of said media to be held.

16. The method according to claim 14, wherein said region includes a first direction and a second direction orthogonal to said first direction, further including the steps of:

a. sequencing said plurality of selected vacuum ports in said first direction according to a length of the media in said first direction; and b. sequencing said plurality of selected vacuum ports in said second direction with said second drive according to a length of the media in said second direction.

17. An imaging system for imaging different size media supported on a media support surface comprising:

a. a front-end server for editing or storing image files to be printed;

b. a raster image processor (RIP) connected to said front end server for processing an image file received from said front-end server into raster image files to be recorded onto a recording media;

c. an image recorder connected to said RIP for recording said raster image files onto said recording media, said image recorder including a media support element having said media support surface including a plurality of vacuum ports disposed thereon, said vacuum ports being connected to a groove pattern disposed on said media support surface for drawing media onto said media support surface;

d. a media handler for storing different size media and for loading said different size media onto the media support surface; and e. a vacuum system for drawing air through said plurality of vacuum ports, said vacuum system being configured to selectively draw air only through each of the vacuum ports covered by the recording media, the vacuum ports covered by the recording media defining a region of said media support surface and including a portion of the plurality of vacuum ports, said region size and shape being predetermined in accordance with the size of the media to be held.

18. The imaging system according to claim 17, wherein said vacuum system comprises:

a device for drawing air communicating with and drawing air through said plurality of vacuum ports to hold the media against said media support surface; and a sequencing vacuum manifold connected between said device for drawing air and said plurality of vacuum ports for selectively drawing air through vacuum ports within said region.

19. The imaging system according to claim 17, further comprising an platesetter controller connected between said RIP and said image recorder, said platesetter controller including receiving information about the size of the media to be held; and a driving device connected to said platesetter controller and said sequencing vacuum manifold driving said sequencing vacuum manifold to draw air through said region of said plurality of vacuum ports.

20. The imaging system according to claim 17, further comprising a media processor connected to said image recorder for automatically processing said recording media after recording.

21. The imaging system according to claim 17, wherein said vacuum system is capable of drawing air at a plurality of air volume levels and wherein one of said plurality of air volume levels is selectable according to the size of the media to be held.

22. The imaging system according to claim 17, wherein said vacuum system is capable of drawing air at a plurality of air volume levels and wherein one of said plurality of air volume levels is selectable according to a stiffness of the media to be held.

23. A system for holding recording media onto a media support surface, comprising:

a media support element including said media support surface, a second side, substantially opposing said media support surface, and a plurality of vacuum ports passing from said media support surface to said second side;

a device, communicating with each of said plurality of vacuum ports, for drawing air through said plurality of vacuum ports to hold the recording media against said media support surface, wherein the device for drawing air is controllable to draw air at a plurality of levels of air volume; and, a sequencing manifold connected between said device for drawing air and said plurality of vacuum ports for selectively drawing air only through each of the vacuum ports covered by the recording media, the covered vacuum ports comprising a portion of the plurality of vacuum ports.

24. The system according to claim 23, wherein said plurality of levels of air volume are selectable according to a size or type of the recording media to be held.

25. The system according to claim 23, wherein said recording media is drawn from a web of recording media and wherein said plurality of levels of air volume are selectable according to a width of said web of recording media.

26. A system for holding recording media onto a media support surface, comprising:
- a media support element including said media support surface, a second side, substantially opposing said media support surface, and a plurality of vacuum ports passing from said media support surface to said second side;
- a device, communicating with each of said plurality of vacuum ports, for drawing air through said plurality of vacuum ports to hold the recording media against said media support surface;
- a sequencing manifold connected between said device for drawing air and said plurality of vacuum ports for selectively drawing air only through each of the vacuum ports covered by the recording media;
- a support base for supporting said media support element at said second side;
- a plurality of air channels disposed within said support base for channeling air between said sequencing manifold and said plurality of vacuum ports; and
- a sealing element interposed between said support base and said second side of the media support element to prevent air leakage between the support base and the media support element, said sealing element including a plurality of apertures for channeling air between said plurality of air channels in the support base and said plurality of vacuum ports in the media support element.

27. The system according to claim 26, wherein said media support element includes a plurality of ribs protruding from said second side, said ribs each having a top surface and a side wall, in contact with said sealing element thereby forming a plurality of vacuum chambers defined by said second side, said side walls and said sealing element, such that each of said plurality of apertures in said sealing element communicates with one of said plurality of air channels and at least one of said plurality of vacuum ports.

28. The system according to claim 27, wherein each of said chambers draws air from more than one of said vacuum ports.

29. The system according to claim 26, further comprising at least one flexure device disposed between said support element and said support base for minimizing deflection of said media support surface while air is being drawn through said plurality of vacuum ports.

30. The system according to claim 29, wherein said flexure device allows deflection in only one direction.

31. The system according to claim 29, wherein said media support element comprises a portion of a cylinder having an axial direction and wherein said flexure device allows deflection in said axial direction only.

32. The system according to claim 26, wherein said support base is comprised of polymer concrete.

33. A system for holding recording media onto a media support surface, comprising:
- a media support element including said media support surface, a second side, substantially opposing said media support surface, and a plurality of vacuum ports passing from said media support surface to said second side;
- a device, communicating with each of said plurality of vacuum ports, for drawing air through said plurality of vacuum ports to hold the recording media against said media support surface;
- a sequencing manifold connected between said device for drawing air and said plurality of vacuum ports for selectively drawing air only through each of the vacuum ports covered by the recording media; and
- a plurality of groove patterns disposed along said media support surface for drawing air from between the media and the media support surface, said plurality of groove patterns each communicating with at least one of said plurality of vacuum ports, wherein said plurality of groove patterns each includes a plurality of groove edges oriented such that none of said groove edges is orthogonal to a direction of displacement of the recording media, and wherein some of said groove edges are angled with respect to the direction of displacement.

34. A method for holding recording media onto a media support surface, said media support surface including a plurality of vacuum ports disposed thereon, said vacuum ports communicating with a device for drawing air through the vacuum ports, comprising the steps of:
- a. positioning the recording media over a region of the media support surface, the recording media covering said region and a portion of the plurality of vacuum ports;
- b. selecting the vacuum ports disposed in said region of the media support surface covered by the recording media for drawing air through;
- c. selectively drawing air through each of the selected vacuum ports disposed in said region;
- d. selecting a volume of air to be drawn through said vacuum ports; and
- e. commanding said device for drawing air to draw air at the selected volume.

35. An imaging system for imaging different size media supported on a media support surface comprising:
- a. a front-end server for editing or storing image files to be printed;
- b. a raster image processor (RIP) connected to said front end server for processing an image file received from said front-end server into raster image files to be recorded onto a recording media;
- c. an image recorder connected to said RIP for recording said raster image files onto said recording media, said image recorder including a media support element having said media support surface including a plurality of vacuum ports disposed thereon, said vacuum ports being connected to a groove pattern disposed on said media support surface for drawing media onto said media support surface;
- d. a media handler for storing different size media and for loading said different size media onto the media support surface; and
- e. a vacuum system for drawing air through said plurality of vacuum ports, said vacuum system being configured to selectively draw air only through each of the vacuum ports covered by the recording media, the vacuum ports covered by the recording media defining a region of said media support surface and including a portion of the plurality of vacuum ports, said region size and shape being predetermined in accordance with the size of the media to be held;
- wherein the vacuum system is capable of drawing air at a plurality of air volume levels and wherein one of said plurality of air volume levels is selectable according to the size or stiffness of the media to be held.

* * * * *